(12) United States Patent
Zelsnack (10) Patent No.: US 9,727,339 B2
(45) Date of Patent: Aug. 8, 2017

(54) METHOD AND SYSTEM FOR DISTRIBUTED SHADER OPTIMIZATION

(71) Applicant: NVIDIA Corporation, Santa Clara, CA (US)

(72) Inventor: Jeremy Zelsnack, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 42 days.

(21) Appl. No.: 13/945,230

(22) Filed: Jul. 18, 2013

(65) Prior Publication Data

US 2015/0022541 A1   Jan. 22, 2015

(51) Int. Cl.
*G06F 9/38* (2006.01)
*G06F 9/45* (2006.01)

(52) U.S. Cl.
CPC ............. *G06F 9/38* (2013.01); *G06F 8/44* (2013.01); *G06F 8/443* (2013.01)

(58) Field of Classification Search
None
See application file for complete search history.

(56) References Cited

U.S. PATENT DOCUMENTS

| 6,158,047 | A * | 12/2000 | Le | G06F 9/45504 717/153 |
| 2009/0213128 | A1* | 8/2009 | Chen | 345/503 |
| 2010/0302261 | A1* | 12/2010 | Abdo et al. | 345/506 |
| 2014/0258996 | A1* | 9/2014 | Brackman et al. | 717/151 |

* cited by examiner

*Primary Examiner* — Aaron M Richer (57) ABSTRACT

Embodiments of the present invention are operable to communicate a list of important shaders and their current best-known compilations to remote client devices over a communications network. Client devices are allowed to produce modified shader compilations by varying optimizations. If a client device produces a modified compilation that beats an important shader's current best-known compilation, embodiments of the present invention can communicate this new best-known shader compilation back to a host computer system. Furthermore, embodiments of the present invention may periodically broadcast the new best-known shader compilation back to client devices for possible further optimization or for efficient rendering operations using the best-known shader compilation.

22 Claims, 6 Drawing Sheets

Exemplary System Broadcast to Optimize an Interesting Set of Shaders

Exemplary Shader Optimization Procedures performed by Client Device

Figure 2A

Exemplary Shader Optimization Procedures performed by Host Computer System

METHOD AND SYSTEM FOR DISTRIBUTED SHADER OPTIMIZATION

FIELD OF THE INVENTION

Embodiments of the present invention are generally related to the field of graphics processing.

BACKGROUND OF THE INVENTION

Shaders are often used in the field of graphics processing to dynamically provide high quality images for applications, such as video games. Shaders can be used by applications to adjust, the levels of light and color for images displayed to the user in real-time. Well-known shaders in the field include vertex shaders, geometry shaders, pixel shaders, etc. In providing this high degree of rendering flexibility, shaders are often compiled during a run-time execution of an application. As such, shader compilers generally have a very short amount of time to produce an optimized shader compilation.

When performing optimization procedures on a shader, shader compilers generally have the burden of selecting an ordered list of optimizations from a very large configuration space. The order and selection of optimization passes performed during optimization procedures can significantly affect the performance of shaders, both in execution performance and power. As such, conventional methods generally fail to provide shader compilers with an efficient selection strategy that may be executed within the limited amount of time available for them to perform these optimization procedures for compilation. Furthermore, the inefficiencies associated with conventional methods may result in poor shader performance and, ultimately, may result in the user being frustrated with an application's performance.

SUMMARY OF THE INVENTION

Accordingly, what is needed is a solution that is capable of enabling shader compilers to produce highly optimized shader compilation within a short period of time. Embodiments of the present invention are operable to communicate a list of important shaders and their current best-known compilations to remote client devices over a communications network. Client devices are allowed to produce modified shader compilations by varying optimizations. If a client device produces a modified compilation that beats an important shader's current best-known compilation, embodiments of the present invention can communicate this new best-known shader compilation back to a host computer system. Furthermore, embodiments of the present invention may periodically broadcast the new best-known shader compilation back to client devices for possible further optimization or for efficient rendering operations using the best-known shader compilation.

More specifically, in one embodiment, the present invention is implemented as a method of optimizing shader code. The method includes a client device performing optimization procedures on a shader to produce a modified shader compilation, where the modified shader compilation differs from a best-known shader compilation associated with the shader. In one embodiment, the performing further includes using a plurality of different optimization passes on the shader. In one embodiment, the performing further includes heuristically determining an order for executing optimization passes on the shader. In one embodiment, the performing further includes performing the optimization procedures responsive to receiving a communication from the remote device over the communications network concerning the shader.

The method also includes comparing the modified shader compilation to the best-known shader compilation to determine a new best-known shader compilation associated with the shader. In one embodiment, the comparing further includes comparing shader latency scores associated with the modified shader compilation and the best-known shader compilation.

Furthermore, the method includes, provided the modified shader compilation is the new best-known shader compilation, communicating the modified shader compilation to a remote device (e.g., a server device) over a communication network. In one embodiment, the communicating further includes communicating a set of optimization parameters and an order for executing optimization passes on the shader based on the modified shader compilation. In one embodiment, the communicating further includes communicating shader latency scores associated with the modified shader compilation.

In one embodiment, the present invention is implemented as a system for optimizing shader code. The system includes a server system receiving module operable to receive a modified shader compilation concerning a shader from a remote client device over a communication network, where the modified shader compilation differs from a best-known shader compilation associated with the shader. In one embodiment, the receiving module is further operable to receive a shader latency score associated with the modified shader compilation. In one embodiment, the receiving module is further operable to receive a set of optimization parameters and an order for executing optimization passes associated with the modified shader compilation.

Also, the system includes a comparison module operable to compare the modified shader compilation to the best-known shader compilation to determine a new best-known shader compilation associated with the shader. In one embodiment, the comparison module is further operable to compare shader latency scores associated with the modified shader compilation and the best-known shader compilation.

Furthermore, the system includes a publishing module operable to communicate the modified shader compilation to a plurality of remote devices over the communication network, where the modified shader compilation is the new best-known shader compilation associated with the shader. In one embodiment, the publishing module is further operable to communicate a set of optimization parameters and an order for executing optimization passes on the shader based on the modified shader compilation to the plurality of remote client devices. In one embodiment, the publishing module is further operable to communicate a shader latency score associated with the modified shader compilation to the plurality of remote client devices. In one embodiment, the publishing module is further operable to communicate a request for the plurality of client devices to optimize the modified shader compilation.

In one embodiment, the present invention is implemented as a method of optimizing shader code. The method includes, using a server system, receiving a modified shader compilation concerning a shader from a remote client device over a communication network, where the modified shader compilation differs from a best-known shader compilation associated with the shader. In one embodiment, the receiving further includes receiving a shader latency score associated with the modified shader compilation. In one embodiment, the receiving further includes receiving a set of optimization parameters and an order for executing optimization passes associated with the modified shader compilation. The method also includes comparing the modified shader compilation to the best-known shader compilation to determine a new best-known shader compilation associated with the shader. In one embodiment, the comparing further includes comparing shader latency scores associated with the modified shader compilation and the best-known shader compilation.

Furthermore, the method includes, provided the modified shader compilation is the new best-known shader compilation associated with the shader, the server system communicating the modified shader compilation to a plurality of remote client devices over the communication network. In one embodiment, the communicating further includes communicating a set of optimization parameters and an order for executing optimization passes on the shader based on the modified shader compilation to the plurality of remote client devices. In one embodiment, the communicating further includes communicating a shader latency score associated with the modified shader compilation to the plurality of remote client devices. In one embodiment, the communicating further includes communicating a request for the plurality of remote client devices to optimize the modified shader compilation.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 2A and 2B) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Optimized Shader Distribution Method

Figure 1A:
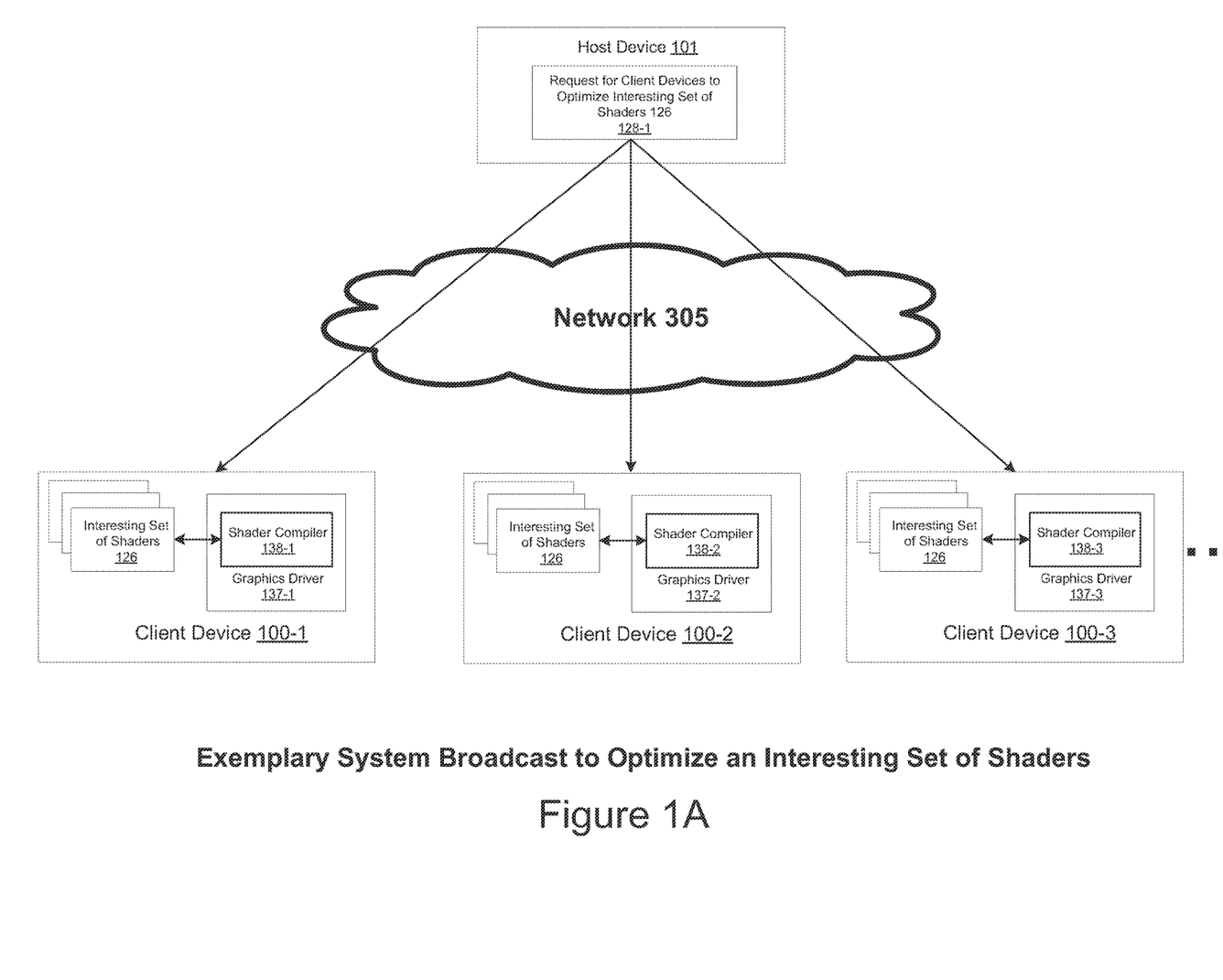
FIG. 1A is a block-level diagram of an exemplary system broadcast to optimize a set of shaders in accordance with embodiments of the present invention.

FIG. 1A provides an exemplary network communication between host device 101 and remote client devices 100-1, 100-2 and 100-3 in accordance with embodiments of the present invention. As illustrated by the embodiment depicted in FIG. 1A, host device 101 may send periodic requests (e.g., request 128-1) over communications network 305 for client devices 100-1, 100-2, and 100-3 to optimize an interesting or selected set of shaders 126. During the performance of optimization procedures on the interesting set of shaders 126, a shader compiler (e.g., shader compilers 138-1, 138-2, 138-3) may utilize a number of different configurations involving various optimization passes and/or heuristic orders of optimization pass execution associated with its graphics driver (e.g., graphics drivers 137-1, 137-2, 137-3). For instance, Table I provides an exemplary list of optimization passes that may be performed by the shader compiler of a client device when performing optimization procedures on the interesting set of shaders 126. In effect, in response to a request from the host system, the client device may produce various optimizations, (e.g., subset selection and/or various ordering of optimizations, to produce new shader compilations. The newly produced shader compilations can then be compared against the best-known shader compilation.

TABLE I

Copy propagate
Constant folding

TABLE I-continued

Schedule instructions
Register coloring
Register allocation
strength reduction
Loop unrolling
Split live ranges
Hoist invariants
Demote to predicate
Optimize comparison to predicate
Back propagate predicates
Sink conditional
MOV coalescing
Hoist kill instructions
Vectorize reads/writes
Propagate reads
Normalize loops
Merge blocks
Predicate code
Coalesce branches
Predicate atomics
Convert loads to uniforms According to one embodiment, request 128-1 may include a set of optimization parameters for various optimization passes performed by a shader compiler and/or an order of optimization pass execution for purposes of optimizing the interesting set of shaders 126. The set of optimization parameters and/or order for optimization pass execution included with request 128-1 may be determined based on prior optimization configurations known to produce a current best compilation result associated with the interesting set of shaders 126 known to host device 101. Additionally, in one embodiment, request 128-1 may also include a pre-compiled binary file that represents an executable form of the current best-known shader compilation result.

Furthermore, according to one embodiment, request 128-1 may also include shader latency scores representing the current best-known compilation result associated with the interesting set of shaders 126. Shader latency scores may be used as metric data by embodiments of the present invention for purposes of gauging how well a particular shader compilation performed. For instance, higher shader latency scores may be computed for compilations that required a smaller number of clock cycles to compile the interesting set of shaders 126. Similarly, lower shader latency scores may be computed for compilations that required a larger number of clock cycles to compile the interesting set of shaders 126. In this manner, embodiments of the present invention may correlate high shader latency scores with highly efficient shader compilation results.

Although three client devices are depicted in FIG. 1A, embodiments of the present invention support configurations which include a greater number of client devices as well as configurations that include a fewer number of client devices. Additionally, network 305 may be a wireless network, a wired network, or a combination thereof. According to one embodiment, network 305 may enable communications through the creation of network sockets, which may enable client devices 100-1, 100-2 and 100-3 and host device 101 to receive and transmit data packets over network 305.

Figure 1B:
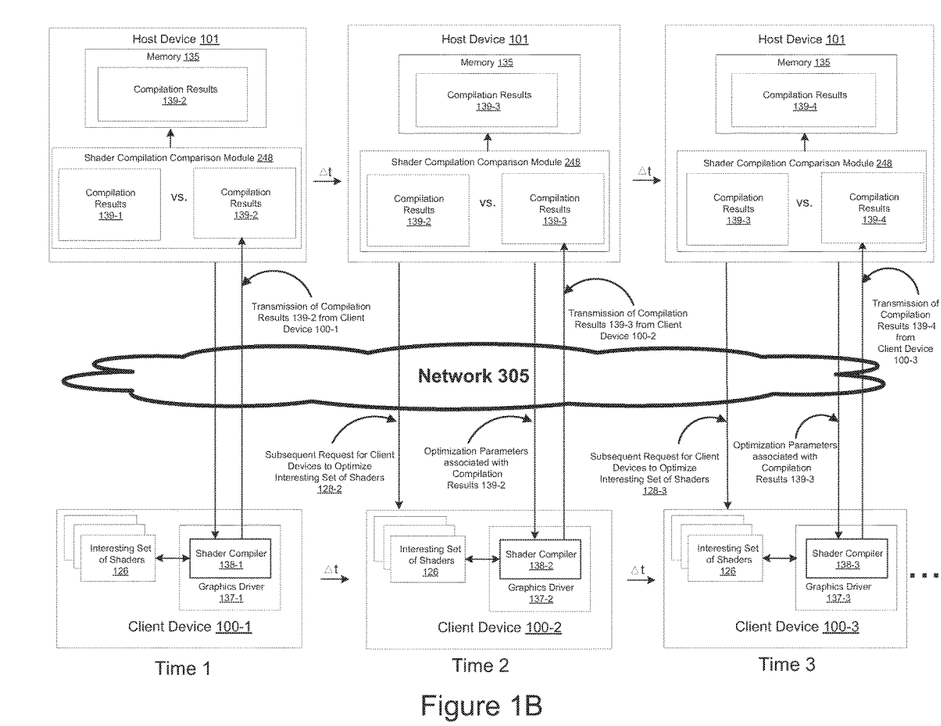
FIG. 1B is a block-level diagram of an exemplary distributed shader optimization process responsive to a system broadcast for optimization of a set of shaders in accordance with embodiments of the present invention.

FIG. 1B illustrates how client devices may be capable of optimizing an interesting set of shaders in response to requests made by a host computer system in accordance with embodiments of the present invention. According to the embodiment depicted in FIG. 1B, compilation results 139-1 may represent the current best compilation result associated with the interesting set of shaders 126 known to host device 101. As such, compilation results 139-1 may possess the highest shader latency scores associated with the interesting set of shaders 126 known to host device 101.

Therefore, in response to requests made by host device 101 to optimize compilation results 139-1 (e.g., request 128-1 in FIG. 1A), client devices 100-1, 100-2, and 100-3 may perform optimization procedures on compilation results 139-1 in an effort to further optimize the interesting set of shaders 126 (e.g., produce a higher shader latency score than compilation results 139-1). According to one embodiment, host device 101 may include compilation results 139-1 within the request 128-1 broadcasted. Furthermore, according to one embodiment, the performance of optimization procedures by client devices 100-1, 100-2, and 100-3 may occur during run-time compilations of an application using the interesting set of shaders 126. In one embodiment, the performance of optimization procedures by client devices 100-1, 100-2, and 100-3 on the interesting set of shaders 126 may occur independent of application's execution (e.g., configuring shader compilers 138-1, 138-2, 138-3 to perform optimization procedures as a background system task).

With reference to FIG. 1B, at Time 1, client device 100-1 may perform optimization procedures on compilation results 139-1 using shader compiler 138-1 in an effort to further optimize the interesting set of shaders 126. In one embodiment, shader compiler 138-1 may use the shader latency score associated with compilation results 139-1 included in request 128-1 to gauge whether shader compiler 138-1 has obtained a more efficient shader compilation result than compilation results 139-1. Additionally, in one embodiment, shader compiler 138-1 may use the set of optimization parameters and/or an order for optimization pass execution included with request 128-1 to produce a more efficient shader compilation result than compilation results 139-1.

Through experimentation with various optimization configurations, shader compiler 138-1 may produce a shader compilation result (e.g., compilation results 139-2) that is more efficient than compilation results 139-1. As such, according to one embodiment, client device 100-1 may confirm the efficiency of compilation results 139-2 by using a local comparison module (not pictured) to determine whether compilation results 139-2 produces a higher shader latency score than compilation results 139-1. If the comparison module determines that compilation results 139-2 produces a higher shader latency score, client device 100-1 may then proceed to communicate compilation results 139-2 to host device 101 over communications network 305 for further processing, including potential broadcasting to all client devices.

According to one embodiment, the communication of compilation results 139-2 to host device 101 may include the shader latency score computed for compilation results 139-2. Also, in one embodiment, the communication of compilation results 139-2 may include a pre-compiled binary file that represents an executable form of compilation results 139-2 (including any shader identification tags used by host device 101 to associated the pre-compiled binary file to the interesting set of shaders 126). Furthermore, according to one embodiment, the communication of compilation results 139-2 may include a set of optimization parameters for various optimization passes performed and/or an order of optimization pass execution used by shader compiler 138-1 to produce compilation results 139-2.

Upon receipt of compilation results 139-2 by host device 101, shader compilation comparison module 248 may be used by host device 101 to compare compilation results 139-2 to compilation results 139-1. If shader compilation comparison module 248 confirms that compilation results 139-2 is better than compilation results 139-1, host device 101 may record compilation results 139-2 as the new current best-known compilation result associated with the interesting set of shaders 126.

At Time 2, host device 101 may send a subsequent request (e.g., request 128-2) over communications network 305 for client devices 100-1, 100-2, and 100-3 to further optimize the interesting set of shaders 126 (e.g., compilation results 139-2). According to one embodiment, host device 101 may include compilation results 139-2 within the request 128-2 broadcasted. In response, client device 100-2 may perform optimization procedures on compilation results 139-2 using shader compiler 138-2 in an effort to further optimize the interesting set of shaders 126. In one embodiment, shader compiler 138-2 may use the shader latency score associated with compilation results 139-2 (included in request 128-2) to gauge whether shader compiler 138-2 has obtained a more efficient shader compilation result than compilation results 139-2. Additionally, in one embodiment, shader compiler 138-2 may use a set of optimization parameters and/or an order for optimization pass execution used to produce compilation results 139-2 (included with request 128-2) to produce a more efficient shader compilation result than compilation results 139-2.

Through experimentation with various optimization configurations, shader compiler 138-2 may produce a shader compilation result (e.g., compilation results 139-3) that is more efficient than compilation results 139-2. As such, according to one embodiment, client device 100-2 may confirm the efficiency of compilation results 139-3 by using a local comparison module (not pictured) to determine whether compilation results 139-3 produces a higher shader latency score than compilation results 139-2. If the comparison module determines that compilation results 139-3 produces a higher shader latency score, client device 100-2 may then proceed to communicate compilation results 139-3 to host device 101 over communications network 305 for further processing.

According to one embodiment, the communication of compilation results 139-3 to host device 101 may include the shader latency score computed for compilation results 139-3. Also, in one embodiment, the communication of compilation results 139-3 may include a pre-compiled binary file that represents an executable form of compilation results 139-3. Furthermore, according to one embodiment, the communication of compilation results 139-3 may include a set of optimization parameters for various optimization passes performed and/or an order of optimization pass execution used by shader compiler 138-2 to produce compilation results 139-3.

Upon receipt of compilation results 139-3 by host device 101, shader compilation comparison module 248 may be used by host device 101 to compare compilation results 139-3 to compilation results 139-2. If shader compilation comparison module 248 confirms that compilation results 139-3 is better than compilation results 139-2, host device 101 may record compilation results 139-3 as the new current best-known compilation result associated with the interesting set of shaders 126.

Furthermore, at Time 3, host device 101 may send a subsequent request (e.g., request 128-3) over communications network 305 for client devices 100-1, 100-2, and 100-3 to further optimize the interesting set of shaders 126 (e.g., compilation results 139-3). According to one embodiment, host device 101 may include compilation results 139-3 within the request 128-3 broadcasted.

In response, client device 100-3 may perform optimization procedures on compilation results 139-3 using shader compiler 138-3 in an effort to further optimize the interesting set of shaders 126. In one embodiment, shader compiler 138-3 may use the shader latency score associated with compilation results 139-3 (included in request 128-3) to gauge whether shader compiler 138-3 has obtained a more efficient shader compilation result than compilation results 139-3. Additionally, in one embodiment, shader compiler 138-3 may use a set of optimization parameters and/or an order for optimization pass execution used to produce compilation results 139-3 (included with request 128-2) to produce a more efficient shader compilation result than compilation results 139-3.

Through experimentation with various optimization configurations, shader compiler 138-3 may produce a shader compilation result (e.g., compilation results 139-4) that is more efficient than compilation results 139-3. As such, according to one embodiment, client device 100-3 may confirm the efficiency of compilation results 139-4 by using a local comparison module (not pictured) to determine whether compilation results 139-4 produces a higher shader latency score than compilation results 139-3. If the comparison module determines that compilation results 139-4 produces a higher shader latency score, client device 100-3 may then proceed to communicate compilation results 139-4 to host device 101 over communications network 305 for further processing.

According to one embodiment, the communication of compilation results 139-4 to host device 101 may include the shader latency score computed for compilation results 139-4. Also, in one embodiment, the communication of compilation results 139-4 may include a pre-compiled binary file that represents an executable form of compilation results 139-4. Furthermore, according to one embodiment, the communication of compilation results 139-4 may include a set of optimization parameters for various optimization passes performed and/or an order of optimization pass execution used by shader compiler 138-3 to produce compilation results 139-4.

Upon receipt of compilation results 139-4 by host device 101, shader compilation comparison module 248 may be used by host device 101 to compare compilation results 139-4 to compilation results 139-3. If shader compilation comparison module 248 confirms that compilation results 139-4 is better than compilation results 139-3, host device 101 may record compilation results 139-4 as the new current best-known compilation result associated with the interesting set of shaders 126.

Although the embodiment in FIG. 1B depicts three different clients performing optimizations in response to requests broadcasted by host device 101, embodiments of the present invention are not limited as such. For instance, a single client device (e.g., client device 100-1, 100-2, or 100-3) may be capable of continuously providing optimized compilations for the interesting set of shaders 126 in response to requests made by host device 101. Furthermore, although the embodiments in FIGS. 1A and 1B depict communication of best-known shader compilations between client devices (e.g., client devices 100-1, 100-2, 100-3) and a host device (e.g., host device 101), embodiments of the present invention are not limited as such. According to one embodiment, client devices may request other client devices to optimize of an interesting set of shaders. In this manner, client devices may be capable of communicating best-known shader compilations directly with each other.

Figure 2A:
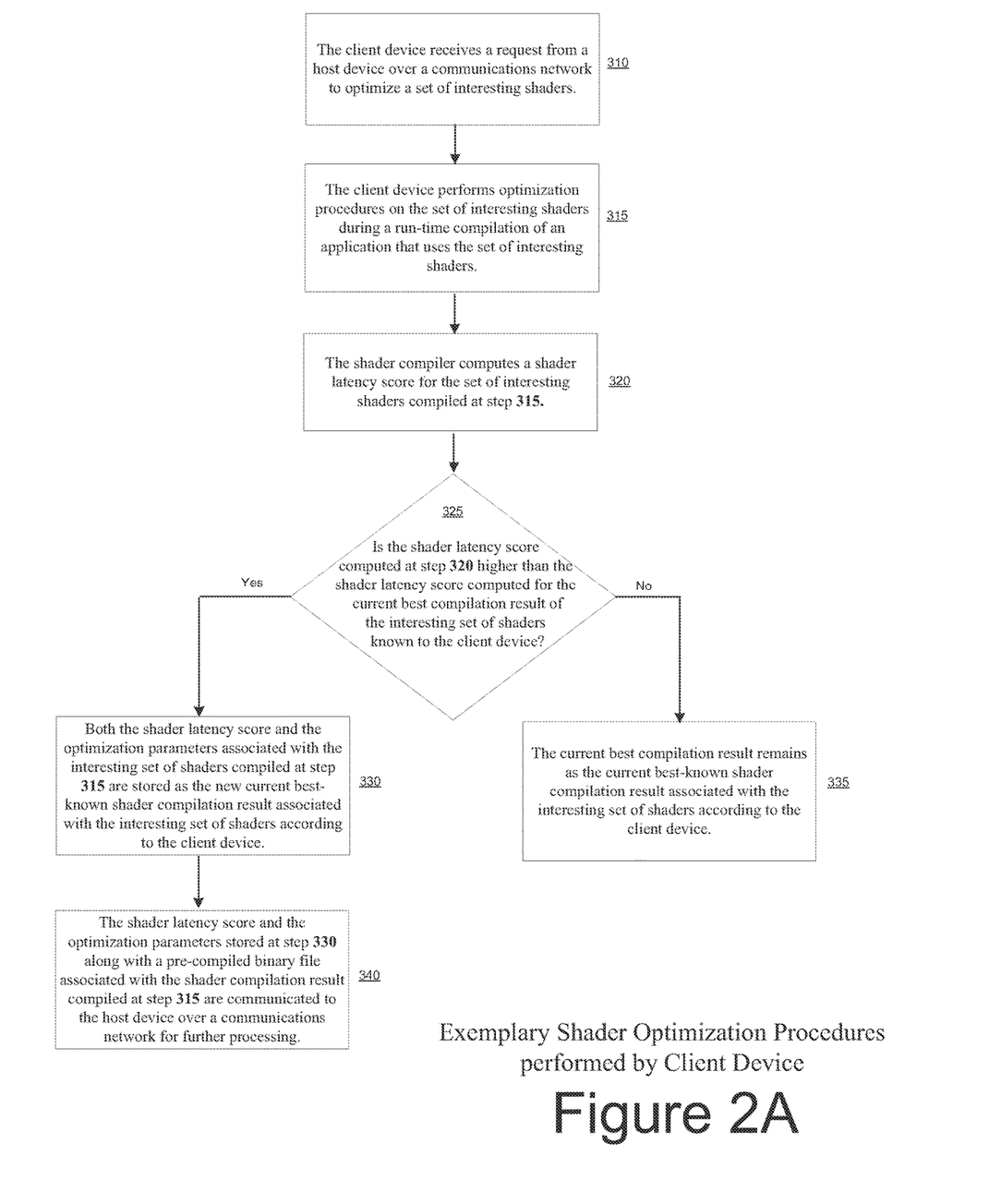
FIG. 2A is a flowchart that depicts exemplary operations performed by a client device during a distributed shader optimization process in accordance with embodiments of the present invention.

FIG. 2A presents an exemplary shader optimization procedures performed by a client device in accordance with embodiments of the present invention.

At step 310, the client device receives a request from a host device over a communications network to optimize a set of interesting shaders.

At step 315, the client device performs various optimization procedures on the set of interesting shaders during a run-time compilation of an application that uses the set of interesting shaders. Actual optimizations passes can be randomly selected or use a bench mark associated with the client device (e.g., driver of client device).

At step 320, the shader compiler computes a shader latency score for the set of interesting shaders compiled at step 315.

At step 325, a determination is made as to whether the shader latency score computed at step 320 is higher than the shader latency score computed for the current best compilation result of the interesting set of shaders known to the client device. If the shader latency score computed at step 320 is higher, then both the shader latency score and the optimization parameters associated with the interesting set of shaders compiled at step 315 are stored as the new current best-known shader compilation result associated with the interesting set of shaders according to the client device, as detailed in step 330. If the shader latency score computed at step 320 is not higher, then the current best-known compilation result remains as the current best-known shader compilation result associated with the interesting set of shaders according to the client device, as detailed in step 335.

At step 330, the shader latency score computed at step 320 is higher than the shader latency score computed for the current best compilation result of the interesting set of shaders known to the client device and, therefore, both the shader latency score and the optimization parameters associated with the interesting set of shaders compiled at step 315 are stored as the new current best-known shader compilation result associated with the interesting set of shaders according to the client device.

At step 335, the shader latency score computed at step 320 is not higher than the shader latency score computed for the current best compilation result of the interesting set of shaders known to the client device and, therefore, the current best compilation result remains as the current best-known shader compilation result associated with the interesting set of shaders according to the client device.

At step 340, the shader latency score and the optimization parameters stored at step 330 along with a pre-compiled binary file associated with the shader compilation result compiled at step 315 are communicated to the host device over a communications network for further processing.

Figure 2B:
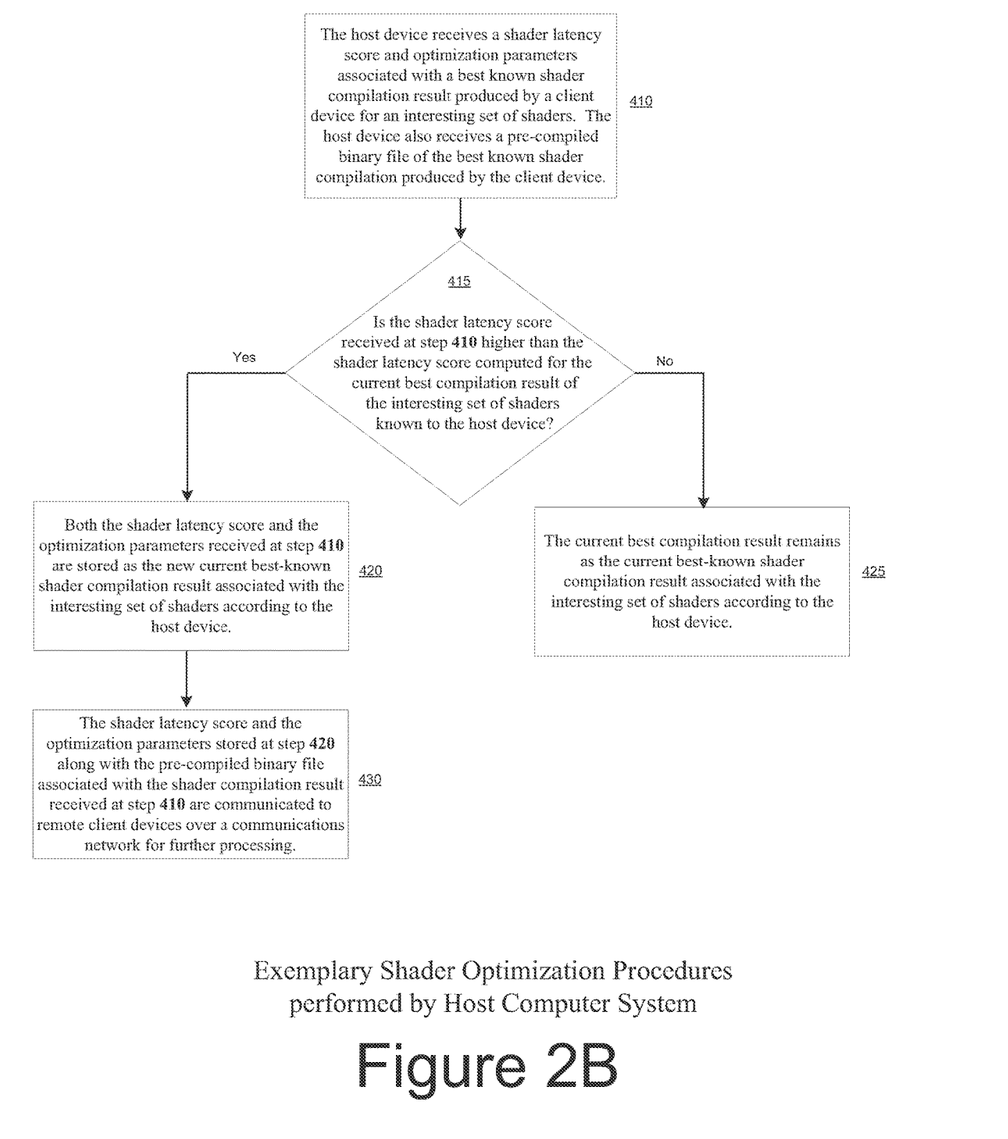
FIG. 2B is a flowchart that depicts exemplary operations performed by a host computer system during a distributed shader optimization process in accordance with embodiments of the present invention.

FIG. 2B presents an exemplary shader optimization procedures performed by a host device in accordance with embodiments of the present invention.

At step 410, the host device receives a shader latency score as well as optimization parameters and/or an order of optimization pass execution associated with a best known shader compilation result produced by a client device for an interesting set of shaders. The host device also receives a pre-compiled binary file of the best-known shader compilation produced by the client device.

At step 415, a determination is made by the host device as to whether the shader latency score received at step 410 is higher than the shader latency score computed for the current best compilation result of the interesting set of shaders known to the host device. If the shader latency score received at step 410 is higher, then the shader latency score as well as the optimization parameters and/or an order of optimization pass execution received at step 410 are stored as the new current best-known shader compilation result associated with the interesting set of shaders according to the host device, as detailed in step 420. If the shader latency score received at step 410 is not higher, then the current best-known compilation result remains as the current best-known shader compilation result associated with the interesting set of shaders according to the host device, as detailed in step 425.

At step 420, the shader latency score received at step 410 is higher than the shader latency score computed for the current best compilation result of the interesting set of shaders known to the host device and, therefore, the shader latency score as well as the optimization parameters and/or an order of optimization pass execution received at step 410 are stored as the new current best-known shader compilation result associated with the interesting set of shaders according to the host device.

At step 425, the shader latency score computed at step 410 is not higher than the shader latency score computed for the current best compilation result of the interesting set of shaders known to the host device and, therefore, the current best-known compilation result known to the host device remains as the current best-known shader compilation result associated with the interesting set of shaders according to the host device.

At step 430, the shader latency score and the optimization parameters stored at step 420 along with the pre-compiled binary file associated with the shader compilation result received at step 410 are communicated to remote client devices over a communications network for further optimization.

Exemplary Client Device

Figure 3:
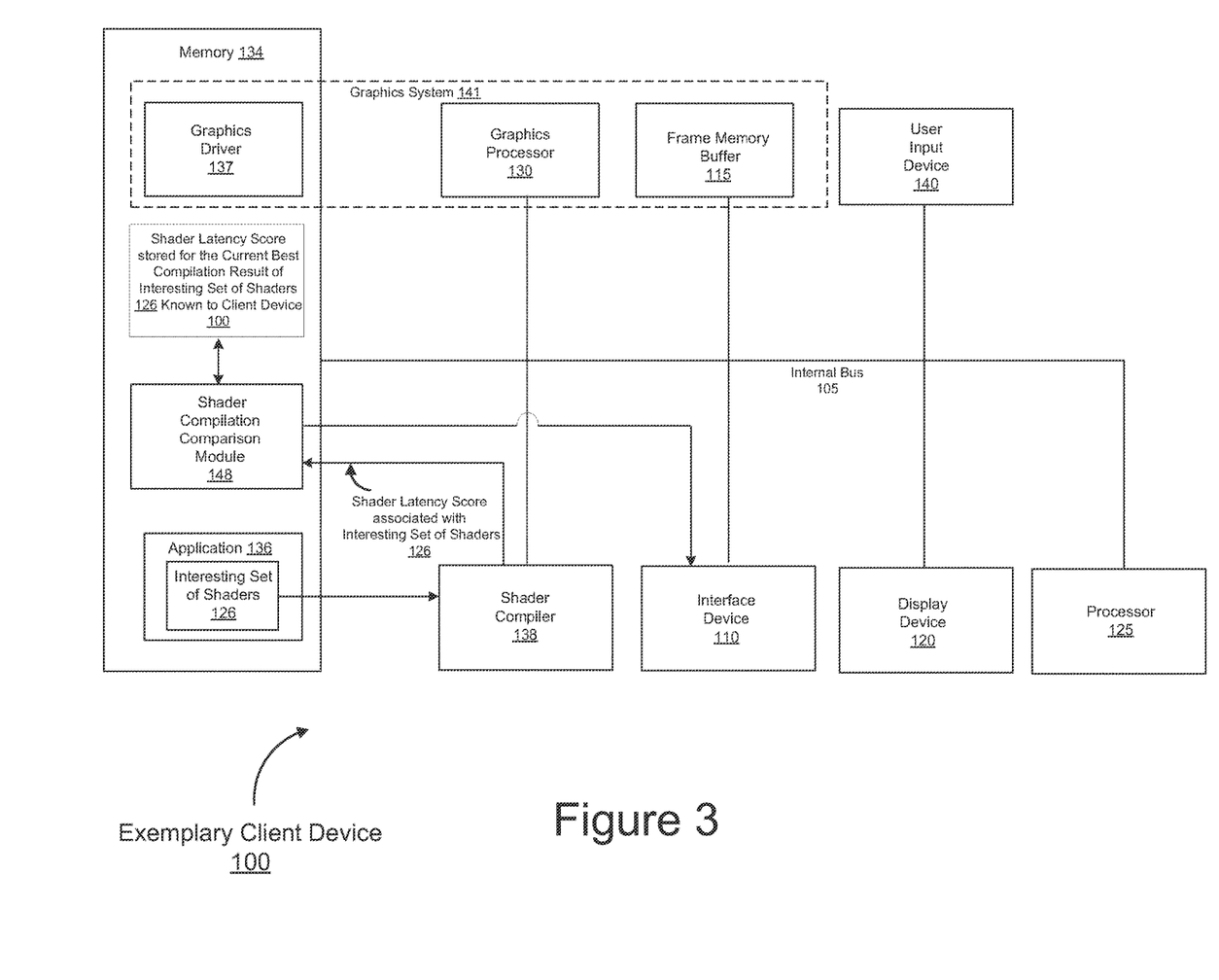
FIG. 3 is a block-level diagram of an exemplary client device capable of implementing a method of distributed shader optimization in accordance with embodiments of the present invention.

As presented in FIG. 3, an exemplary client device 100 upon which embodiments of the present invention may be implemented is depicted. Client device 100 may be implemented as an electronic device capable of communicating with other computer systems. Furthermore, client device 100 may be any type of device that has the capability to receive inputs from a user and send such inputs to a host computer system (e.g., host device 101). According to one embodiment, client device 100 may include user input device 140, processor 125, display device 120, interface module 110, shader compiler 138, and shader compilation comparison module 148. Additionally, client device 100 may include graphics system 141 which, in one embodiment, may include graphics driver 137, graphics processor 130, and frame memory buffer 115.

Shader compiler 138 may include the functionality to perform standard compiling procedures. For instance, according to one embodiment, shader compiler 138 may include the functionality to transform a human readable shader language medium (e.g., OpenGL, DirectX, etc.) into machine code that is capable of being executed by a graphic processing unit (e.g., GPU). As such, shader compiler 138 may be capable of performing standard compiling procedures on high-level shader computer code during a run-time execution of an application, such as lexical analysis, pre-processing, parsing, semantic analysis, code generation, code optimization, etc.

During the performance of code optimization procedures, shader compiler 138 may be capable of performing a number of different optimization passes on shaders associated with an application (e.g., interesting set of shaders 126). Furthermore, graphics driver 137 may be capable of ordering the performance of optimization passes in a manner that enables shader compiler 138 to efficiently compile shaders. For instance, according to one embodiment, graphics driver 137 may use heuristic procedures in selecting an order for optimization pass performance. Heuristic procedures may include using empirical data associated with a set of optimization passes available to graphics driver 137 for purposes of determining a preferred order for execution. In this manner, shader compiler 138 may perform optimization passes at run-time using a heuristic order determined by graphics driver 137.

Empirical data used by graphics driver 137 to select orders for executing optimization passes may include using compiler performance metrics. As described herein, according to one embodiment, shader compiler 138 may compute shader latency scores for compiled shaders. Computed scores may reflect how quickly and efficiently a shader is capable of being compiled by shader compilers similar to shader compiler 138. For instance, higher shader latency scores may be computed for shaders that take a lesser number of clock cycles to compile. Similarly, lower shader latency scores may be computed for shaders that require a greater number of clock cycles to compile. In this manner, embodiments of the present invention may correlate a shader latency score with the performance of a particular shader compilation.

Shader compilation comparison module 148 may include the functionality to compare shader compilation results produced by shader compiler 138 to a best-known shader compilation result stored locally by client device 100. According to one embodiment, for a particular shader or set of shaders (e.g., interesting set of shaders 126), shader compilation comparison module 148 may compare a shader latency score computed by shader compiler 138 for a recent compilation of the shader to a shader latency score already computed and stored for the current best compilation result of the shader known to client device 100. If shader compilation comparison module 148 determines that the shader latency score of the recent compilation is better (e.g., higher) than the score of the current best compilation result stored, client device 100 may record the recent compilation produced by shader compiler 138 as the new best shader compilation result known to client device 100 and store a pre-compiled binary file representing an executable form of the recent shader compilation locally in memory 134. Furthermore, optimization parameters and/or orders of optimization pass execution used to produce the recent shader compilation may also be stored in memory resident on client device 100 for further processing by embodiments of the present invention.

Interface module 110 may include the functionality to communicate with other computer systems (e.g., host device 101) via an electronic communications network (e.g., network 305), including wired and/or wireless communication and including the Internet. In one embodiment, interface module 110 may include the functionality to communicate shader latency scores computed for shader compilation results produced by shader compiler 138. Also, interface module 110 may include the functionality to communicate pre-compiled binary files representing an executable form of shader compilation results produced by shader compiler 138 (including any shader identification tags used by computer systems to associated the pre-compiled binary file to a particular shader). Furthermore, interface module 110 may include the functionality to communicate optimization parameters for various optimization passes performed and/or an order of optimization pass execution used by shader compiler 138-1 to produce shader compilation results.

Processor 125 may include the functionality to read and process instructions for running software applications and optionally an operating system. User input device 140 may be a device capable of receiving user input including, but not limited to, a keyboard, mice, joystick, and/or touch screen display, or the like. Furthermore, display device 120 may include the functionality to display output. Examples of display device 120 may include, but are not limited to, a liquid crystal display (LCD), a plasma display, cathode ray tube (CRT) monitor, etc.

In one embodiment, graphics system 141 may comprise graphics driver 137, graphics processor 130 and frame memory buffer 115. Graphics processor 130 may be operable to process instructions from applications resident on client device 100 (e.g., application 136) and to communicate data with processor 125 via internal bus 105 for rendering the data on display device 120. Graphics processor 130 generates pixel data for output images from rendering commands and may be configured as multiple virtual graphic processors that are used in parallel (concurrently) by a number of applications, such as application 136, executing in parallel.

Frame memory buffer 115 may be used for storing pixel data for each pixel of an output image. In another embodiment, frame memory buffer 115 and/or other memory may be part of memory 134 which may be shared with processor 125 and/or graphics processor 130. Additionally, in another embodiment, client device 100 may include additional physical graphics processors, each configured similarly to graphics processor 130. These additional graphics processors may be configured to operate in parallel with graphics processor 130 to simultaneously generate pixel data for different portions of an output image, or to simultaneously generate pixel data for different output images.

Exemplary Host Device

Figure 4:
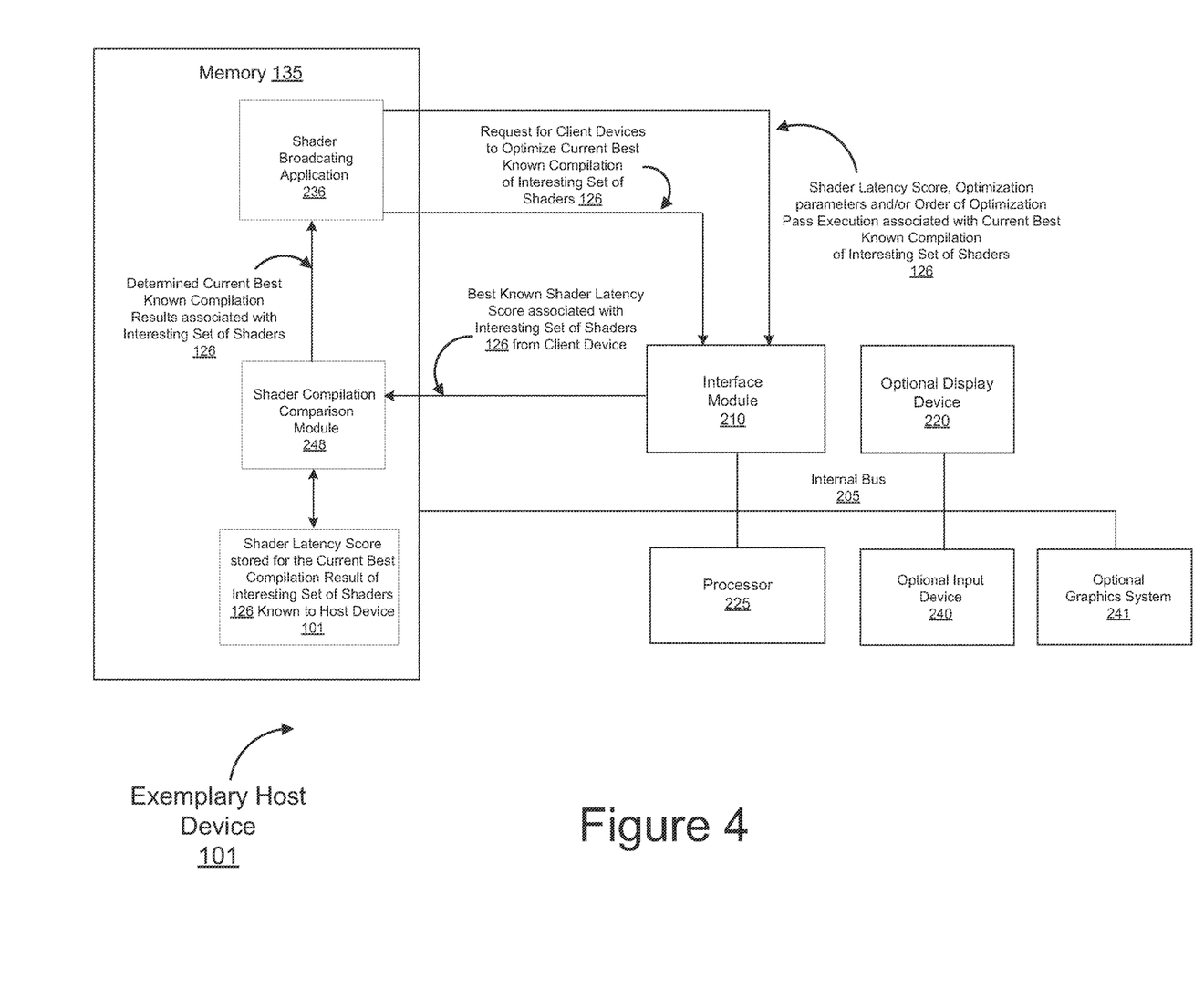
FIG. 4 is a block-level diagram of an exemplary host computer system capable of implementing a method of distributed shader optimization in accordance with embodiments of the present invention.

As presented in FIG. 4, an exemplary host device 101 upon which embodiments of the present invention may be implemented is depicted. Exemplary host device 101 may be implemented as a server, laptop, desktop computer or the like, as contemplated by embodiments of the present invention. In one embodiment of the present invention, host device 101 may be a virtualized server device in a data center. According to one embodiment, host device 101 may include optimal input device 240, processor 225, optional display device 220, interface module 210, shader broadcasting application 236, and shader compilation comparison module 248. Additionally, host device 101 may include optional graphics system 241.

Shader compilation comparison module 248 may include the functionality to compare shader compilation results received from client devices to a best-known shader compilation result stored locally by host device 101. According to one embodiment, for a particular shader or set of shaders (e.g., interesting set of shaders 126), shader compilation comparison module 248 may compare a shader latency score received from a client device for a recent compilation of the shader to a shader latency score already computed and stored for the current best compilation result of the shader known to the host device 101. If shader compilation comparison module 248 determines that the shader latency score of the compilation received is better (e.g., higher) than the score of the current best compilation result stored, host device 101 may record the compilation received from the client device as the new best shader compilation result for the shader known to host device 101. Additionally, host device 101 may store a pre-compiled binary file representing an executable form of the new best shader compilation result received from the client device locally in memory 135. Furthermore, optimization parameters and/or orders of optimization pass execution used to produce the new best shader compilation result received from the client device may also be stored in memory 135 for further processing by embodiments of the present invention.

Interface module 210 may include the functionality to communicate with other computer systems (e.g., client device 100) via an electronic communications network (e.g., network 305), including wired and/or wireless communication and including the Internet. According to one embodiment, interface module 210 may receive instructions from shader broadcasting application 236 to communicate a list of important shaders and their current best-known compilations to client devices over a communications network. These communications may be in the form of requests made by host device 101 to client devices to optimize a particular shader or set of shaders (e.g., interesting set of shaders 126). As such, interface module 210 may include the functionality to communicate a set of optimization parameters and/or an order of optimization pass execution associated with a current best known compilation result for a particular shader or set of shaders (e.g., interesting set of shaders 126) known to host device 101. Additionally, interface module 210 may include the functionality to communicate a pre-compiled binary file that represents an executable form of the current best-known compilation result. Furthermore, interface module 210 may include the functionality to communicate shader latency scores representing the current best-known shader compilation result for a particular shader or set of shaders.

Processor 225 may include the functionality to read and process instructions for running software applications and optionally an operating system. Optional input device 240 may be a device capable of receiving user input including, but not limited to, a keyboard, mice, joystick, and/or touch screen display, or the like. Optional graphics system 241 may comprise components similar to that of client device 100 (see FIG. 3). As such, optional graphics system 241 may include the functionality to generate a stream of rendered data to be delivered to client devices over a network by providing configuration instructions to graphics processor 130. Furthermore, optional display device 220 may include the functionality to display output. Examples of optional display device 220 may include, but are not limited to, a liquid crystal display (LCD), a plasma display, cathode ray tube (CRT) monitor, etc.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of optimizing shader code, said method comprising:
    a client device performing optimization procedures on a shader to produce a modified shader compilation result, wherein said modified shader compilation result differs from a current best-known shader compilation result associated with said shader known among a plurality of client devices;
    comparing said modified shader compilation result to said current best-known shader compilation result to determine if said modified shader compilation result has a reduced compile time than said current best-known shader compilation result associated with said shader; and
    provided said modified shader compilation result has a reduced compile time than said current best-known shader compilation result, communicating said modified shader compilation result to a remote device over a communication network for said remote device to communicate said modified shader compilation result to said plurality of client devices as a new best-known shader compilation result.

2. The method as described in claim 1, wherein said performing further comprises using a plurality of different optimization passes on said shader with a plurality of corresponding optimization parameters.

3. The method as described in claim 1, wherein said performing further comprises heuristically determining an order for executing optimization passes on said shader.

4. The method as described in claim 1, wherein said performing further comprises performing said optimization procedures responsive to receiving a communication from said remote device over said communications network concerning said shader.

5. The method as described in claim 1, wherein said comparing further comprises comparing shader latency scores associated with said modified shader compilation result and said current best-known shader compilation result, wherein said shader latency scores represent shader compile times.

6. The method as described in claim 1, wherein said modified shader compilation result comprises shader latency scores.

7. The method as described in claim 6, wherein said modified shader compilation result further comprises a set of optimization parameters and an order for executing optimization passes on said shader.

8. A system for optimizing shader code, said system comprising:
a memory;
a processor coupled to said memory and configured to:
receive a modified shader compilation result concerning a shader from a remote client device over a communication network, wherein said modified shader compilation result differs from a current best-known shader compilation result associated with said shader known among a plurality of client devices;
compare said modified shader compilation result to said current best-known shader compilation result to determine a new best-known shader compilation result associated with said shader provided said modified shader compilation result has a reduced compile time than said current best-known shader compilation result; and
communicate said modified shader compilation result to a plurality of remote devices over said communication network, wherein said modified shader compilation result is said new best-known shader compilation result associated with said shader.

9. The system as described in claim 8, wherein said modified shader compilation result further comprises a shader latency score.

10. The system as described in claim 9, wherein said modified shader compilation result further comprises a set of optimization parameters and an order for executing optimization passes.

11. The system as described in claim 8, wherein said processor is further configured to compare shader latency scores associated with said modified shader compilation result and said current best-known shader compilation result, wherein said shader latency scores represent compile times.

12. The system as described in claim 8, wherein said modified shader compilation result comprises optimization parameters, an order for executing optimization passes on said shader, and a binary executable.

13. The system as described in claim 8, wherein said modified shader compilation result comprises a shader latency score and a binary executable.

14. The system as described in claim 8, wherein said processor is further configured to communicate a request for said plurality of client devices to optimize said modified shader compilation result.

15. A method of optimizing shader code, said method comprising:
receiving a modified shader compilation result concerning a shader from a remote client device over a communication network, wherein said modified shader compilation result differs from a current best-known shader compilation result associated with said shader known among a plurality of client devices;
comparing said modified shader compilation result to said current best-known shader compilation result to determine a new best-known shader compilation result associated with said shader based on said modified shader compilation result having a reduced compile time compared to said current best-known shader compilation result; and
provided said modified shader compilation result is said new best-known shader compilation result associated with said shader, communicating said modified shader compilation result to a plurality of remote client devices over said communication network.

16. The method as described in claim 15, wherein said modified shader compilation result comprises a shader latency score.

17. The method as described in claim 16, wherein said shader latency score is based on a number of clock cycles used to compile said shader.

18. The method as described in claim 15, wherein said modified shader compilation result comprises a set of optimization parameters and an order for executing optimization passes.

19. The method as described in claim 15, wherein said comparing further comprises comparing shader latency scores associated with said modified shader compilation result and said current best-known shader compilation result, wherein said shader latency scores represent shader compile times.

20. The method as described in claim 15, wherein said modified shader compilation result comprises optimization parameters, an order for executing optimization passes on said shader, and a binary executable.

21. The method as described in claim 15, wherein said modified shader compilation result comprises a shader latency score and a binary executable.

22. The method as described in claim 15, wherein said communicating further comprises communicating a request for said plurality of remote client devices to optimize said modified shader compilation result.

* * * * *